US012592023B2

(12) United States Patent
Barnard

(10) Patent No.: US 12,592,023 B2
(45) Date of Patent: Mar. 31, 2026

(54) INTERSECTION TESTING FOR RAY TRACING

(71) Applicant: Imagination Technologies Limited, Kings Langley (GB)

(72) Inventor: Daniel Barnard, Berkhamsted (GB)

(73) Assignee: Imagination Technologies Limited, Kings Langley (GB)

( * ) Notice: Subject to any disclaimer, the term of this patent is extended or adjusted under 35 U.S.C. 154(b) by 228 days.

(21) Appl. No.: 18/426,273

(22) Filed: Jan. 29, 2024

(65) Prior Publication Data

US 2024/0169656 A1 May 23, 2024

Related U.S. Application Data

(63) Continuation of application No. 17/547,614, filed on Dec. 10, 2021, now Pat. No. 11,887,244.

(30) Foreign Application Priority Data

Dec. 10, 2020 (GB) ...................................... 2019500

(51) Int. Cl.
*G06T 15/06* (2011.01)
*G06T 15/00* (2011.01)
(52) U.S. Cl.
CPC ............ *G06T 15/06* (2013.01); *G06T 15/005* (2013.01); *G06T 2200/28* (2013.01); *G06T 2210/12* (2013.01); *G06T 2210/21* (2013.01)

(58) Field of Classification Search
None
See application file for complete search history.

(56) References Cited

U.S. PATENT DOCUMENTS

| | | | |
|---|---|---|---|
| 8,502,819 B1 | 8/2013 | Aila et al. | |
| 2008/0117206 A1* | 5/2008 | Shearer ................... | G06T 15/06 |
| | | | 345/421 |
| 2008/0129734 A1 | 6/2008 | Seung-Woo et al. | |
| 2013/0235049 A1 | 9/2013 | Karras | |
| 2015/0109300 A1 | 4/2015 | Lee et al. | |
| 2017/0091898 A1 | 3/2017 | Hwang et al. | |
| 2017/0309059 A1 | 10/2017 | Howson et al. | |
| 2019/0318445 A1 | 10/2019 | Benthin et al. | |
| 2020/0051316 A1 | 2/2020 | Laine et al. | |
| 2020/0193681 A1 | 6/2020 | Saleh | |

* cited by examiner

*Primary Examiner* — Andrew G Yang
(74) *Attorney, Agent, or Firm* — Potomac Law Group, PLLC; Vincent M DeLuca

(57) ABSTRACT

A system and method for performing intersection testing of rays in a ray tracing system. The ray tracing system uses a hierarchical acceleration structure comprising a plurality of nodes, each identifying one or more elements for intersection testing. The system defines and updates progress information that identifies, for a ray, leaf nodes of the hierarchical acceleration structure which identify elements for which it is not yet known whether or not the ray interests.

17 Claims, 5 Drawing Sheets

324

702

704

714

CPU

GPU

710

Display 716

Speakers 718

Camera 719

720

706

Memory

712

802

804

806

IC definition dataset

Layout processing

Circuit layout definition

Intergrated circuit generation

Integrated circuit

INTERSECTION TESTING FOR RAY TRACING

CROSS-REFERENCE TO RELATED APPLICATIONS AND CLAIM OF PRIORITY

This application is a continuation under 35 U.S.C. 120 of application Ser. No. 17/547,614 filed Dec. 10, 2021, now U.S. Pat. No. 11,887,244, which claims foreign priority under 35 U.S.C. 119 from United Kingdom Application No. 2019500.4 filed Dec. 10, 2020, the contents of which are incorporated by reference herein in their entirety.

BACKGROUND

Ray tracing systems can simulate the manner in which rays (e.g. rays of light) interact with a scene. For example, ray tracing techniques can be used in graphics rendering systems which are configured to produce images from 3-D scene descriptions. The images can be photorealistic, or achieve other objectives. For example, animated movies can be produced using 3-D rendering techniques that employ ray tracing techniques. The description of a 3-D scene typically comprises data defining geometry in the scene. This geometry data is typically defined in terms of primitives, which are often triangular primitives, but can sometimes be other shapes such as other polygons, lines or points.

Ray tracing mimics the natural interaction of light with objects in a scene, and sophisticated rendering features can naturally arise from ray tracing a 3-D scene. Ray tracing can be parallelized relatively easily on a pixel-by-pixel level because pixels generally are independent of each other. However, it is difficult to pipeline the processing involved in ray tracing because of the distributed and disparate positions and directions of travel of the rays in the 3-D scene, in circumstances such as ambient occlusion, reflections, caustics, and so on. Ray tracing allows for realistic images to be rendered but often requires high levels of processing power and large working memories, such that ray tracing can be difficult to implement for rendering images in real-time (e.g. for use with gaming applications), particularly on devices which may have tight constraints on silicon area, cost and power consumption, such as on mobile/portable devices (e.g. smart phones, tablets, laptops, etc.).

At a very broad level, ray tracing involves: (i) intersection testing, to identify intersections between rays and geometry (e.g. primitives) in the scene, and (ii) shading, which comprises performing some processing (e.g. by executing a shader program) in response to identifying an intersection to determine how the intersection contributes to the image being rendered. The execution of a shader program may cause further rays to be emitted into the scene. These further rays may be referred to as "secondary rays".

A lot of processing is involved in identifying intersections between rays and geometry in the scene. In a very naïve approach, every ray could be tested against every primitive in a scene and then when all of the intersection hits have been determined, the closest of the intersections could be identified. This approach is not practical to implement for scenes that may have millions or billions of primitives, where the number of rays to be processed may also be in the millions. Consequently, ray tracing systems typically use an acceleration structure which characterizes the geometry in the scene in a manner which can reduce the work needed for intersection testing. However, even with current state of the art acceleration structures, it is difficult to perform intersection testing at a rate that is suitable for rendering images in real-time (e.g. for use with gaming applications), particularly on devices which have tight constraints on silicon area, cost and power consumption, such as on mobile devices (e.g. smart phones, tablets, laptops, etc.).

Modern ray tracing architectures typically use acceleration structures based on bounding volume hierarchies—in particular, bounding box hierarchies. Primitives are grouped together into bounding boxes that enclose them. These bounding boxes are, in turn, grouped together into larger bounding boxes that enclose them. Intersection testing then becomes easier, because, if a ray misses a bounding box, there is no need to test it against any of the children of that bounding box.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A system and method for performing intersection testing of rays in a ray tracing system. The ray tracing system uses a hierarchical acceleration structure comprising a plurality of nodes, each identifying one or more elements able to be intersected by a ray. The system makes use of a serial-mode ray intersection process, in which, when a ray intersects a bounding box, a limited number of new ray requests are generated, and intersection information, usable to identify bounding box for which ray requests were not generated, are stored.

There is provided a computer-implemented method of performing intersection testing between a ray and elements identified by nodes of a hierarchical acceleration structure of a ray tracing system, wherein a node identifies one or more elements for intersection testing, wherein elements identified by non-leaf nodes of the hierarchical acceleration structure are represented by a further node of the hierarchical acceleration structure.

The computer-implemented method comprises: defining a sequential value for each leaf node of the hierarchical acceleration structure, wherein the sequential values of the leaf nodes that branch from any given non-leaf node are sequential with respect to one another; defining a value for each non-leaf node of the hierarchical acceleration structure, wherein, for each non-leaf node, the value facilitates identification of the sequential values of any leaf nodes that branch from the said non-leaf node; defining progress information for the ray, the progress information comprising first progress information identifying the earliest sequential value amongst the sequential values of leaf nodes for which it is not known whether or not the ray intersects any of their elements; performing an intersection testing process to identify any intersections between the ray and elements identified by the nodes of the hierarchical acceleration structure; and during the intersection testing process, updating the progress information based on any identified intersections between the ray and the elements identified by the nodes of the hierarchical acceleration structure.

The progress information alone can be used to improve an understanding of the state of intersection testing or to control how the intersection testing process is performed. For instance, the number of intersections tests between the ray and elements identified by nodes of the hierarchical structure performed in a clock cycle or series of clock cycles of an intersection testing system can be restricted, whilst minimizing the likelihood that some intersection tests will be missed.

The present disclosure thereby provides a mechanism by which the progress of intersection testing between a ray and elements identified by nodes of an acceleration structure can be tracked, generating information that identifies an internal state of the intersection testing process.

The intersection testing process may be an iterative intersection testing process, which may comprise: obtaining one or more ray requests for the ray, each ray request identifying a different node that identifies elements against which the ray is to undergo intersection testing; identifying, by processing the obtained one or more ray requests, any intersections between the ray and any elements identified by any node identified by the obtained one or more ray requests; and updating the progress information based on any identified intersections between the ray and the elements identified by the nodes of the hierarchical acceleration structure.

Optionally, the step of obtaining one or more ray requests for the ray comprises obtaining up to a predetermined maximum number of ray requests for the ray. The predetermined maximum number of ray request may be equal to 1.

For a first iteration of the intersection testing process, the step of obtaining one or more ray requests may comprise generating a ray request that identifies the root node of the hierarchical acceleration structure.

The iterative intersection testing process may further comprise processing the first progress information and any identified intersections to define one or more ray requests to be obtained in a subsequent iteration of the intersection process.

In some embodiments, the step of processing the first progress information and any identified intersections to define one or more ray requests comprises: processing the first progress information and the identified intersections to identify a first number of identified intersections, the first number of identified intersections being the number of identified intersections which are an intersection between the ray and an element, of a non-leaf node, associated with a leaf node that has, or is a parent node of one or more leaf nodes that have, a sequential value sequentially at or after the sequential value identified by the first progress information; and defining the one or more ray requests based on the first number of identified intersections.

The step of processing the first progress information and any identified intersections to define one or more ray requests optionally comprises, if the first number of identified intersections is less than or equal to the predetermined maximum number: defining a ray request for each identified intersection between the ray and an element of a non-leaf node, each ray request identifying the node associated with the intersected element of the non-leaf node.

The step of processing the first progress information and any identified intersections to define one or more ray requests may comprise: if the first number of identified intersections between the ray and any elements of a non-leaf node is greater than the predetermined maximum number, defining a first set of one or more ray requests to be obtained for a next iteration of the intersection testing process, wherein the number of ray requests in the first set of one or more ray requests is equal to the predetermined maximum number of ray requests, and wherein each identified node in the first set of one or more ray requests: is associated with an intersected element of a non-leaf node; has a sequential value, or is a parent node of one or more leaf nodes having a sequential value, sequentially closest to, but not earlier than, the first progress sequential value amongst the nodes associated with an intersected element.

The step of processing the first progress information and any identified intersections to define one or more ray requests may comprise, if the first number of identified intersections between the ray and any elements of a non-leaf node is zero: defining a ray request that identifies a node at the highest level of the hierarchical acceleration structure which is a parent node of the leaf node having a value equal to the sequential value identified by the first progress information.

The first progress information may comprise a value equal to the earliest sequential value amongst the sequential values of leaf nodes for which it is not known whether or not the ray intersects any of their elements.

In some embodiments, the value for each non-leaf node of the hierarchical acceleration structure comprises a value equal to the earliest sequential value of any leaf nodes that branch from the non-leaf node.

In some examples, the progress information further comprises second progress information which identifies the sequentially earliest sequential value amongst: sequential values of any leaf nodes associated with any intersected element for which no ray request will be or has been defined in that iteration of the intersection testing process; and sequential values of any leaf node which branches from any non-leaf node, associated with any intersected element, for which no ray request will be or has been defined in that iteration of the intersection testing process.

The step of updating the progress information based on the identified intersections may comprise, if no intersections with elements associated with non-leaf nodes are identified, updating the first progress information using the second progress information.

In some examples, the step of updating the progress information based on any identified intersections comprises, if no intersections with elements associated with non-leaf nodes are identified, controlling the first progress information to identify the sequential value identified by the second progress information.

There is also provided an intersection testing system for performing intersection testing between one or more rays and elements identified by nodes of a hierarchical acceleration structure, wherein: a sequential value is defined for each leaf node of the hierarchical acceleration structure, wherein the sequential values of the leaf nodes that branch from any given non-leaf node are sequential with respect to one another; a value is defined for each non-leaf node of the hierarchical acceleration structure, wherein the value of a non-leaf node facilitates identification of the sequential values of any leaf nodes that branch from the non-leaf node; progress information is defined for the ray, the progress information comprising first progress information identifying the earliest sequential value amongst the sequential values of leaf nodes for which it is not known whether or not the ray intersects any of their elements; wherein the intersection testing system is configured to: perform an intersection testing process to identify any intersections between the ray and elements identified by the nodes of the hierarchical acceleration structure; and during the intersection testing process, update the progress information based on any identified intersections between the ray and the elements identified by the nodes of the hierarchical acceleration structure.

In the intersection testing system, a node may identify one or more elements for intersection testing, wherein elements identified by non-leaf nodes of the hierarchical acceleration structure are represented by a further node of the hierarchical acceleration structure.

The intersection testing system may comprise an intersection testing processor configured to perform the intersection testing process. There is also provided a graphics processing system configured to perform any herein described method. There is also provided a graphics processing system comprising any herein described intersection testing system. There is also propose a ray tracing system configured to perform ray tracing, wherein the ray tracing system comprises the intersection testing system. The ray tracing system may comprise the intersection testing system and a shader.

The intersection testing system, ray tracing system, or graphics processing system may be embodied in hardware on an integrated circuit.

There is also provided a method of manufacturing, using an integrated circuit manufacturing system any herein graphics processing system.

Also provided is a method of manufacturing, using an integrated circuit manufacturing system, an intersection testing system, ray tracing system, or graphics processing system as summarized above, the method comprising: processing, using a layout processing system, a computer readable description of the intersection testing system, ray tracing system, or graphics processing system so as to generate a circuit layout description of an integrated circuit embodying the intersection testing system, ray tracing system, or graphics processing system; and manufacturing, using an integrated circuit generation system, the intersection testing system, ray tracing system, or graphics processing system according to the circuit layout description.

There is also provided computer readable code configured to cause any herein claimed method to be performed when the code is run. There is also provided computer readable storage medium having encoded thereon the computer readable code. The storage medium may be a non-transitory computer readable storage medium. When executed at a computer system, the computer readable code may cause the computer system to perform any of the methods described herein.

There is also provided an integrated circuit definition dataset that, when processed in an integrated circuit manufacturing system, configures the integrated circuit manufacturing system to manufacture any herein described graphics processing system as claimed.

Also provided is a non-transitory computer readable storage medium having stored thereon a computer readable description of an intersection testing system, ray tracing system, or graphics processing system as summarized above that, when processed in an integrated circuit manufacturing system, causes the integrated circuit manufacturing system to manufacture an integrated circuit embodying the intersection testing system, ray tracing system, or graphics processing system.

Also provided is a non-transitory computer readable storage medium having stored thereon a computer readable description of an intersection testing system, ray tracing system, or graphics processing system as summarized above which, when processed in an integrated circuit manufacturing system, causes the integrated circuit manufacturing system to: process, using a layout processing system, the computer readable description of the intersection testing system, ray tracing system, or graphics processing system so as to generate a circuit layout description of an integrated circuit embodying the intersection testing system, ray tracing system, or graphics processing system; and manufacture, using an integrated circuit generation system, the intersection testing system, ray tracing system, or graphics processing system according to the circuit layout description.

There is also provided an integrated circuit manufacturing system configured to manufacture the graphics processing system.

The integrated circuit manufacturing system may comprise: a non-transitory computer readable storage medium having stored thereon a computer readable description of an intersection testing system, ray tracing system, or graphics processing system as summarized above; a layout processing system configured to process the computer readable description so as to generate a circuit layout description of an integrated circuit embodying the intersection testing system, ray tracing system, or graphics processing system; and an integrated circuit generation system configured to manufacture the intersection testing system, ray tracing system, or graphics processing system according to the circuit layout description.

The layout processing system may be configured to determine positional information for logical components of a circuit derived from the integrated circuit description so as to generate a circuit layout description of an integrated circuit embodying the intersection testing system, ray tracing system, or graphics processing system. The above features may be combined as appropriate, as would be apparent to a skilled person, and may be combined with any of the aspects of the examples described herein.

These and other aspects of the invention will be apparent from and elucidated with reference to the embodiment(s) described hereinafter.

BRIEF DESCRIPTION OF THE DRAWINGS

Examples will now be described in detail with reference to the accompanying drawings in which.

Figure 1:
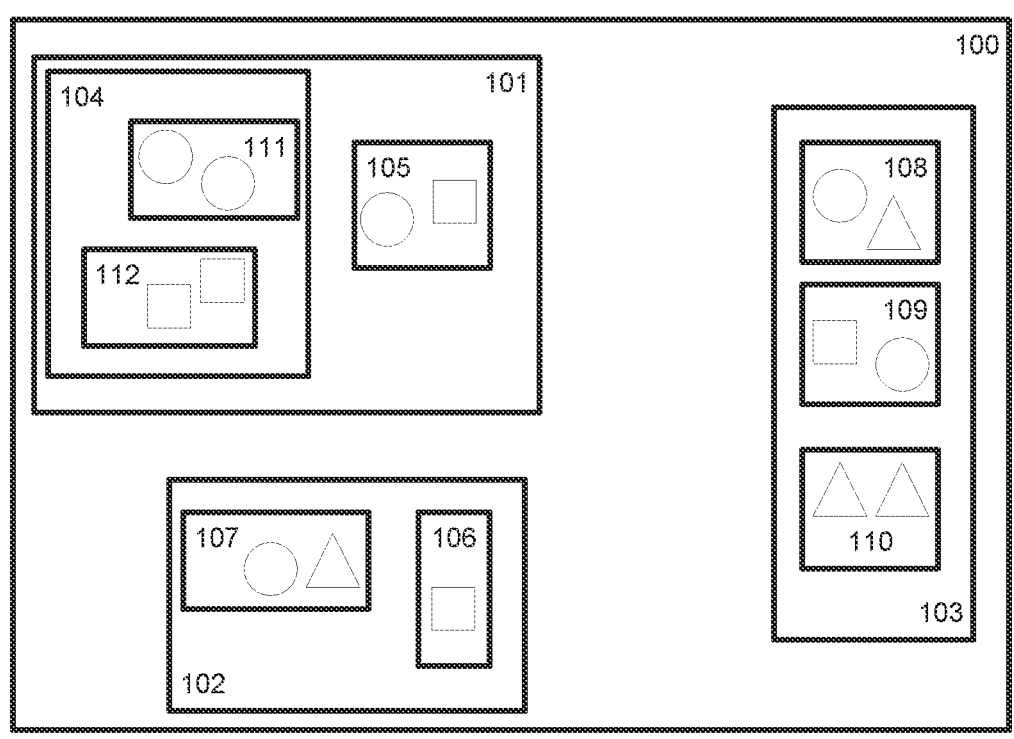
FIG. 1 shows a scene divided according to a bounding volume structure.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Before explaining examples of the disclosed system in detail, it will be useful to explain examples of the acceleration structures that are used.

FIG. 1 illustrates a scene 100, which includes a number of different objects or primitives (illustrated as circles, squares and triangles). The scene is illustrated in two dimensions for simplicity, but in typical examples the primitives are positioned and oriented in three dimensional (3D) space, and the bounding boxes are three dimensional bounding volumes. The scene is conceptually divisible into bounding boxes 101-112, namely axis-aligned bounding boxes (AABBs). Each bounding box thereby represents a portion of the scene. Conceptually, each bounding box bounds or contains one or more elements, where an element can be a bounding box, a primitive or another suitable elemental structure for use in ray tracing architectures (such as an instance which, if intersected by a ray, triggers use of another hierarchical structure). For example, a first group of bounding boxes 101-104 may each bound one or more other bounding boxes. A second group of bounding boxes 105-112 may each bound one or more primitives in the scene. As an example, a bounding box 105 may bound a first set of primitives.

In the illustrated example, a first bounding box 101 bounds two further bounding boxes 104, 105; a second bounding box 102 bounds two further bounding boxes 106, 107 and a third bounding box 103 bounds three further bounding boxes 108, 109, 110. One of the further bounding boxes 104 of the first bounding box 101, a "first further bounding box 104", in turn bounds two additional bounding boxes 111, 112.

It will be clear that if a ray fails to intersect with a bounding box, then it can be inferred that the ray will not intersect with any elements bound by or contained in that bounding box. The use of bounding boxes therefore provides a mechanism for reducing the number of intersection tests that need to be performed.

Figure 2:
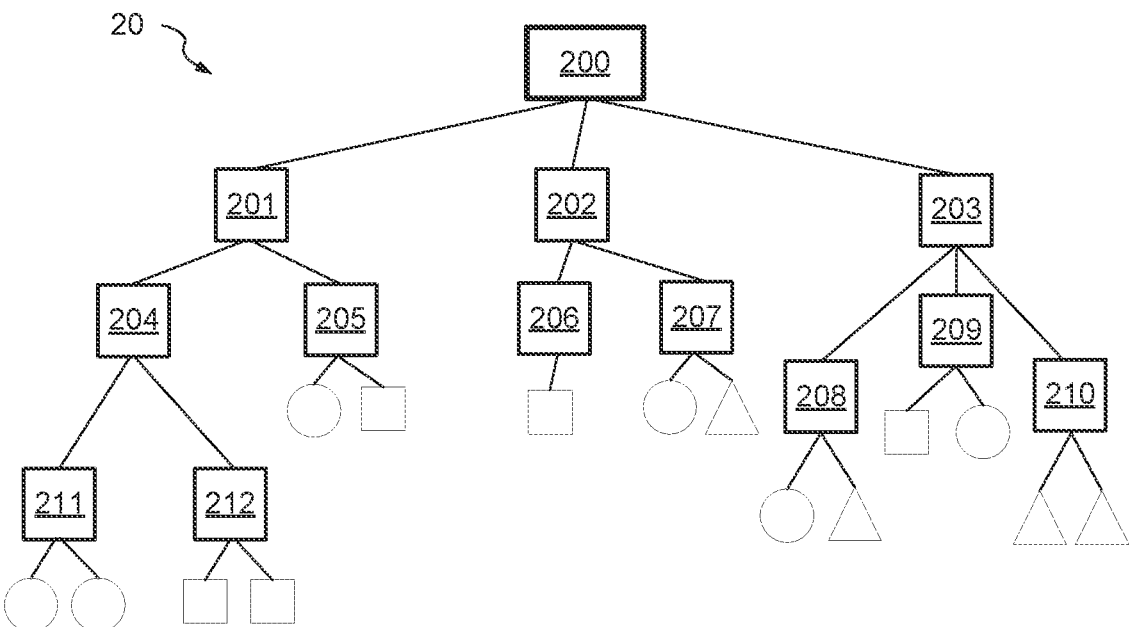
FIG. 2 represents a hierarchical acceleration structure for the bounding volume structure shown in FIG. 1.

The scene 100 can be represented by a hierarchical acceleration structure 20, as illustrated in FIG. 2. The hierarchical acceleration structure 20 is formed of a plurality of nodes 201-212 branching from a root node 200 (representing the scene 100). Each node 201-212 represents a respective bounding box 101-112. In particular, each node may comprise a list (sometimes labelled a "test list") or other collection that identifies any elements contained by the bounding box represented by the node. In this way, each node identifies ("has") one or more elements that could be intersected by a ray (e.g. further bounding boxes or primitives). In the illustrated hierarchical acceleration structure 20, this identification is illustrated as branches from a node.

Methods for determining the bounding boxes for building nodes of a hierarchy are known in the art, and may be performed in a top-down manner (e.g. starting at the root node and working down the hierarchy), or may be performed in a bottom-up manner (e.g. starting at the leaf nodes and working up the hierarchy).

Performing an intersection test on a ray can be performed by working the ray through the hierarchical acceleration structure, starting at the root node. Any intersections between elements of a node (e.g. elements branching from a node) and the ray are identified. If the ray is determined to intersect another bounding box (which is itself represented by a node of the hierarchical acceleration structure), then the ray is tested against the elements of the node represented by that bounding box, thereby working its way through the hierarchical structure.

Methods of determining an intersection between a ray and an element are well known, and typically comprise processing geometries of the element and the data of the ray to identify whether or not the ray intersects the element.

It will be apparent that all non-leaf nodes of the hierarchical acceleration structure identify at least one further bounding box, each represented by another node of the hierarchical acceleration structure.

A distinction must therefore be made between the element (bounding box) represented by a node and the elements identified by a node, which are elements that are contained within the bounding box represented by the node.

The leaf nodes of the hierarchical acceleration structure identify at least one primitive or a single instance (an example of a particular type of bounding box, which will be briefly explained below). Some hierarchical structures may only comprise leaf nodes that identify an instance. Other hierarchical structures may only comprise leaf nodes that identify primitives.

The primitives in this example (a circle, triangle, and square) are simple geometric shapes; therefore, they can each be described using a single primitive. Objects that are more complex may be described by multiple primitives. As will be well known to those skilled in the art, triangular primitives are common in graphics applications. However, the scope of the present disclosure is not limited to triangular primitives. In particular, in ray tracing, primitives may be 'procedural' in the sense that they may be programmatically defined.

The examples illustrated in FIGS. 1 and 2 depict a simple scenario in which all objects of a scene are represented by primitives that are directly identified by leaf nodes of the hierarchical acceleration structure.

However, in some examples, objects can be represented by an "instance", which is a particular type of bounding box and provides another example of an element for a leaf node for the hierarchical acceleration structure 20.

Effectively, the instance locates and orients a predefined object in the scene. An instance is associated with a Bottom Level Acceleration Structure (BLAS) that describes the predefined object within a "local space" for the object, e.g. identifies a relative location of primitives that form the object with respect to some predefined co-ordinate space (which likely differs from the "world space" of the scene, depending upon the orientation of the given instance of the object within the scene). The BLAS may itself be formed of nodes that identify bounding boxes that bound/enclose the primitives of the predefined object, in a similar manner to the previously described structure 20. An instance of the object in a scene can thus be specified by a so-called instance transformation matrix, which maps the object (and its associated bounding volume hierarchy) as defined in the object's "local space" to the required position/orientation in the "world space". The instance transformation matrix may also perform other operations on the underlying object, such as stretches or reflections.

If an intersection between a ray and an instance is detected, this can trigger the traversal of the ray through the BLAS associated with the instance, to thereby determine any intersections between the ray and the primitives of the predefined object.

In this way, an instance is treated as a type of bounding box that, when intersected by a ray, triggers further intersection testing of that ray with one or more nodes of a different hierarchical acceleration structure, rather than with further nodes of the original hierarchical acceleration structure.

Intersection with an instance thereby triggers traversal of a ray through a secondary hierarchical acceleration structure, namely a Bottom Level Acceleration Structure (BLAS). Where one or more BLAS's are available, the hierarchical acceleration structure that has nodes having/identifying elements that are instances that identify BLAS's (e.g. the structure 20) is commonly known as a Top Level Acceleration Structure (TLAS). The TLAS thereby describes the scene at a high level, starting from a root node at the top level, and terminating in instances (identifying BLAS's) and/or primitives at the lowest level. One example of a TLAS terminates in only instances at the lowest level (i.e. does not itself comprise any primitives). The precise nature of the TLAS will depend upon implementation details.

The necessary operations for traversing a BLAS are well known in the art, e.g. transforming either the parameters of a "world space" ray or the geometry of a "local space" node using the instance transformation matrix, to bring the ray and the geometry (of the "local space" node) into the same coordinate system to perform intersection testing, and are not described in detail for the sake of conciseness.

In order to perform intersection testing between rays and elements represented in a scene, previous approaches make use of ray requests. A ray request identifies a ray and a node of the hierarchical acceleration structure having one or more elements against which the ray is to undergo intersection testing. Thus, a ray request is a request to test the ray against the child or children of a particular node of the hierarchical structure.

In previous approaches, if a ray (of a ray request) is determined to intersect with a bounding box, this triggers the generation of a new ray request for the ray. The new ray request is a request to perform intersection testing between that ray and elements of the node that represents the bounding box. A single ray request could therefore trigger the generation of multiple new ray requests (e.g. if the ray of the ray request is determined to intersect with more than one bounding box contained within the bounding box represented by the node of the ray request). Ray requests generated in this way may be stored on a stack for later intersection testing, with that intersection testing itself having the potential to add further ray requests to the stack.

The present disclosure recognizes that this feature of existing approaches means that a chain reaction can take place, in which an extremely large number of ray requests could be generated for a given ray (e.g. if it intersects with many elements of the scene). This chain reaction effect is compounded by the use of multiple rays in the intersection testing process, as there is usually a desire to perform intersection testing on a plurality of rays at a same time. Previous approaches can therefore result in a computationally expensive intersection testing process, requiring large amounts of memory and processing power to perform full intersection testing (i.e. an intersection testing process).

The present disclosure provides a new mechanism for performing intersection testing using a hierarchical acceleration structure. This new mechanism provides a process for performing intersection testing that is able to perform ray tracing with a given ray using a relatively low (or configurable) amount of memory and processing power. The provided mechanism makes use of a new solution, in which information about which nodes have or have not been processed is stored for each ray. Full intersection testing of the ray may then be performed in a number of passes, in which a limited or restricted number of ray requests are active for a ray at any given moment in any particular pass. The stored information allows a subsequent pass to resume intersection testing at the point where a previous pass ended, such that full intersection testing of the ray may be completed.

Figure 3:
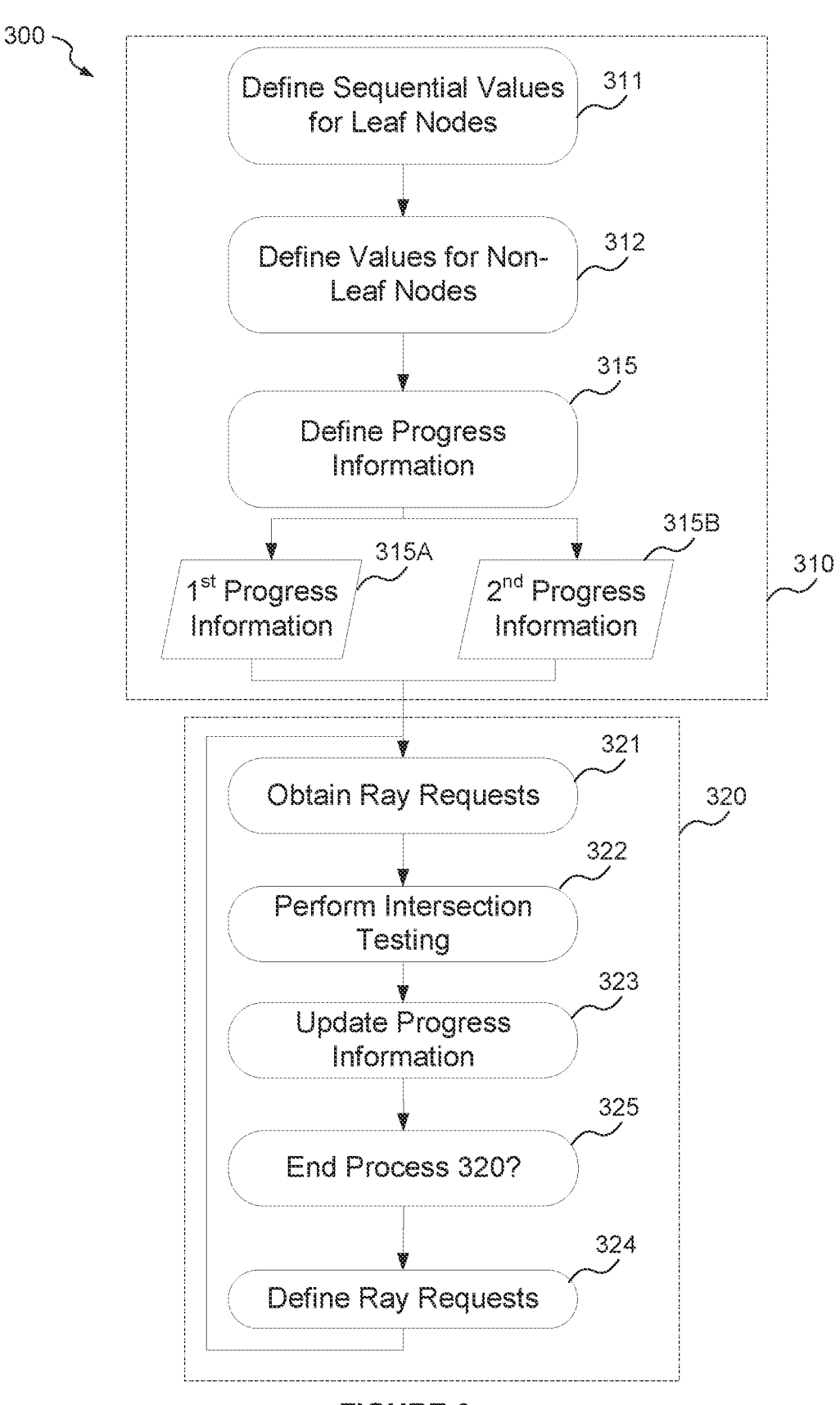
FIG. 3 is a flowchart illustrating a method.

FIG. 3 illustrates a computer-implemented method 300 performed by an embodiment. The computer-implemented method 300 is designed for performing intersection testing between a (single) ray and elements described by the hierarchical acceleration structure.

The computer-implemented method comprises an initialization process 310 and an intersection testing process 320. The initialization process 310 sets up parameters and values for use in the intersection testing process 320.

The initialization process 310 comprises a step 311 of defining a sequential value for each leaf node of the hierarchical acceleration structure. Sequential values of leaf nodes that branch from a same parent node are sequential to one another. It should be clear that this is iterated throughout the hierarchical acceleration structure, e.g. so that all leaf nodes branching from any given non-leaf node (potentially via one or more other non-leaf nodes) have sequential values to one another.

The sequential values, which may be monotonical values, thereby provide a unique identifier for each leaf node, so that no leaf node of a same acceleration structure is associated with the same sequential value.

The collection of sequential values forms a (overall) sequence of sequential values. All the sequential values of nodes that branch from a same (parent) node form a sub-sequence of sequential values. The sequential values in each sequence or sub-sequence are sequential to one another.

Where reference is made in this disclosure to "sequentially before/earlier" or "sequentially after/later", this refers to a comparison of position between two elements in a sequence. Where reference is made in this disclosure to a "sequentially next", this refers to a sequential value that immediately follows a particular sequential value in the overall sequence of sequential values. A "sequentially earliest" or "sequentially latest" refers to a sequentially earliest/latest value within a particular range or subset of sequential values.

As a simple working example, each sequential value may be monotonical (e.g. starting from 0, incrementing in steps of 1 and ending and N−1, where N is the number of leaf nodes). Other suitable sequences of sequential values would be apparent to the skilled person, such as: starting from 1 (incrementing in steps of 1) and ending in N; starting from N (decrementing in steps of 1) and ending in 1; starting from N−1 (decrementing in steps of 1) and ending in 0; starting from 0 (incrementing in steps of 2) and ending in 2N−2; and so on.

The provided system of sequential values for each leaf node allows progress through the hierarchical structure to be tracked. In particular, it can be determined for which leaf nodes it is known whether or not they have elements that intersect with the ray.

The initialization process 310 also comprises a step 312 of defining (i.e. assigning or setting) a value for each non-leaf node. The value of a non-leaf node facilitates identification of the (range of) sequential values of leaf nodes branching from the non-leaf node, and this in turn facilitates the identification of suitable starting points in the hierarchical acceleration structure for testing passes that target particular subsets of its leaf nodes.

For example, the value of a non-leaf node may identify only the earliest or only the latest sequential value amongst all the sequential values of leaf nodes branching from the non-leaf node (e.g. via one or more other leaf nodes). In particular examples, the value of the non-leaf node may be equal to the earliest sequential value amongst all sequential values of any node that branches from the non-leaf node.

Thus, a non-leaf node that is a parent node for other non-leaf nodes may have a value that is equal to the earliest sequential value amongst the values of all non-leaf nodes branching therefrom. This is functionally equivalent to the same non-leaf node having the earliest sequential value amongst the values of all leaf nodes branching therefrom (via other non-leaf nodes).

This approach facilitates identification of all sequential values of leaf nodes branching from the said non-leaf node, as a comparison can be made between the sequential value identified by the non-leaf node and the sequential values identified by each other non-leaf node at the same hierarchical level of the acceleration structure (e.g. to establish the range of sequential values of leaf nodes branching from the said non-leaf node).

As another example, the value of a non-leaf node may identify a group of sequential values of leaf-nodes branching therefrom. In particular, the value of a non-leaf node may contain information related/specific to sequential values of leaf nodes branching therefrom, which is not contained in sequential values of any other leaf node (i.e. information unique to sequential values of leaf nodes branching therefrom). For instance, if the sequential values of the leaf nodes are sequential binary values, the values of non-leaf nodes may identify data (e.g. most significant bits) unique (and common) to the relevant leaf nodes.

For instance, consider a scenario in which an acceleration structure comprises 4 leaf nodes, a first two of which branch from a first non-leaf node and a second two of which branch from a second non-leaf node. The sequential values for the leaf nodes may be set to 000, 001, 010 and 011. The value for the first non-leaf node may be set to 00 (as, being the two most significant bits of their sequential values, this contains information unique and common to the first two leaf nodes) and the value for the second non-leaf node may be set to 01 (as, being the two most significant bits of their sequential values, this is information unique and common to the second two leaf nodes).

This approach may reduce computational complexity and increase the flexibility of a mechanism for defining the (sequential) values for all nodes of the hierarchical structure, as values can be assigned using a top-down approach. This is particularly advantageous if there is a constraint on the maximum number of elements identified by each node, as this provides a constraint on the number of possible options for sequential values of leaf nodes branching therefrom.

As yet another example, step 312 may comprise defining two values for each non-leaf node, e.g. identifying the earliest and latest sequential value amongst all the sequential values of leaf nodes branching from the non-leaf node.

Other examples will be apparent to the skilled person.

The initialization process 310 also comprises a step 315 of defining progress information of a ray traversing through the hierarchical acceleration structure. The progress information facilitates identification of the current progress of the ray through the acceleration structure, e.g. identifying for which leaf nodes it is known whether or not they have elements that intersect with the ray.

The progress information may be stored as part of or alongside ray information for the ray, e.g. in a ray store as set out below.

It will be apparent that if multiple rays are to undergo intersection testing with elements of a single scene represented by a hierarchical structure, then steps 311 and 312 only need to be performed once. Step 315 is performed for each individual ray, so that progress information is defined for each ray. Multiple instances/versions of step 315 can be performed (e.g. in parallel), each version being for a different ray.

The progress information contains at least first progress information 315A. The first progress information 315A contains data facilitating identification of leaf nodes for which it is known whether or not the ray intersects any of the elements. For instance, the first progress information may identify the earliest sequential value amongst the sequential values of all leaf nodes for which it is not known whether or not the ray intersects any of their elements. As an alternative example, the first progress information may identify the latest sequential value amongst the sequential values of all leaf nodes for which is it known whether or not the ray intersects any of their elements.

In one working example, used hereafter for the sake of understanding, the first progress information 315A may identify a "first progress sequential value", being the earliest sequential value amongst the sequential values of leaf nodes for which it is not known whether or not the ray intersects any of their elements. In particular, the first progress information may comprise a "first progress sequential value". However, the skilled person would be capable of providing other approaches for identifying this value (e.g. using a pointer or the like).

Initially, e.g. during the initialization process, the first progress sequential value is the earliest (in the sequence) sequential value amongst sequential values of all leaf nodes.

The intersection testing process 320 is performed iteratively. Each iteration of process 320 may descend one level of the hierarchical acceleration structure until the leaf nodes are reached. Then, if intersection results have not been obtained or otherwise determined for the elements of all leaf nodes, the process 320 may resume processing at a node at a higher level (e.g. at the root node or another non-leaf node) and may then descend the hierarchical acceleration structure on a different path. Each descent of the hierarchical acceleration structure may be called a pass. The intersection testing process is terminated when it is known whether or not the ray intersects with elements of all leaf nodes of the hierarchical acceleration structure.

It will be apparent that, if a ray intersects with the bounding box represented by a non-leaf node, then it is still not known whether or not that ray will intersect with the elements identified by the said non-leaf node (i.e. the elements contained in the bounding box represented by the node). However, if a ray fails to intersect with the bounding box represented by a non-leaf node, then it is known that the ray will not intersect with any element identified by the said non-leaf node (i.e. the elements contained within the bounding box represented by the node).

The intersection testing process 320 comprises a step 321 of obtaining one or more ray requests for the (single) ray to be processed. A ray request identifies a ray and a node of the hierarchical structure having one or more elements against which the ray is to undergo intersection testing. Thus, a ray request is a request to test the ray against the elements identified by a particular node of the hierarchical structure. An initial ray request may be defined which identifies a root node of the hierarchical acceleration structure. Further ray requests may then be defined during iterations of the intersection process 320, and may be stored temporarily in a memory (e.g. on a small stack) from which they may be obtained in step 321.

There may be a maximum number of ray requests obtained in step 321, which is predetermined—i.e. is a "predetermined maximum number". Preferably, the predetermined maximum number is relatively small, e.g. no more than 32, e.g. no more than 16, e.g. no more than 8, e.g. 1.

In particular, step 321 obtains ray requests identifying leaf nodes that have, and/or non-leaf nodes that are parent nodes of leaf nodes that have, sequential values at or after the first progress sequential value. A ray request identifying leaf nodes that have, and/or non-leaf nodes that are parent nodes of leaf nodes that have, sequential values which are all less than the first progress sequential value identifies nodes for which testing has already been completed. Thus, any such ray requests (if present) may be discarded as representing duplicate work.

In some examples, during a first iteration of the intersection testing process, step 321 may comprise obtaining up to a predetermined number of ray requests that together identify one or more non-leaf nodes which are parent nodes of leaf nodes that have the sequentially earliest values amongst the highest-level nodes of the acceleration structure. In some examples, the predetermined number is 1, but this may vary depending upon the layout of the acceleration structure (e.g. if an acceleration structure has multiple root nodes).

The predetermined number is preferably less than or equal to the predetermined maximum number (of ray requests).

Subsequent iterations of the intersection testing process may obtain ray requests defined by a previous iteration of the intersection testing process, as set out below.

The intersection testing process 320 further comprises a step 322 of identifying, by processing the obtained one or more ray requests, any intersections between the ray and any elements identified by the node(s) identified by the obtained one or more ray requests. This step may be performed in a conventional manner, by comparing geometries of the ray to geometries of elements identified by the node(s) (of each ray request) to identify any intersections. An indicator or flag, known as the repeat value or the repeat flag, may be set based on the number of intersections identified. If the number of intersections is greater than a predetermined number (e.g. the predetermined number of ray requests) the flag is set to indicate that the intersections cannot all be processed in this pass, and that at least one further pass will be required.

The intersection testing process 320 comprises a step 323 of updating the progress information (e.g. the first progress sequential value) based on the identified intersections. The first progress sequential value is updated to reflect the progress through the testing process for the ray, allowing the identification of those leaf nodes for which the intersection results are known, and those for which they are not.

Step 323 could be performed by processing identified intersections (and non-intersections) to infer or identify any intersections (and non-intersections) between the ray and elements identified by leaf nodes that have sequential values sequentially at or after the first progress sequential value, and updating the first progress sequential value accordingly.

For example, consider a scenario in which step 322 identifies one or more intersections between the ray and elements identified by non-leaf nodes. The first progress sequential value may be set to the sequentially earliest value amongst values of: (if present) any leaf node that represents an intersected element; and (if present) any leaf node branching from a non-leaf node that represents an intersected element. The first progress sequential value is therefore updated to reflect progress down the levels of the hierarchical acceleration structure (i.e. towards the leaf nodes). The updated first progress sequential value indicates the sequential value of a next leaf node to be intersection tested, and this in turn allows it to be inferred that the intersection result of any leaf node with a smaller value is now known, for example because it branches from a non-leaf node that was not intersected by the ray.

As another example, consider a scenario in which step 322 identifies no intersections between the ray and any element identified by the node(s) identified by the ray request(s). In a simplified embodiment, the first progress sequential value may be set to the next sequential value after the sequentially latest value amongst values of: (if present) any leaf node identified by the one or more ray requests; and (if present) any leaf node branching from any non-leaf node identified by the one or more ray requests. The first progress sequential value is therefore updated to indicate that testing is complete (for that pass of the hierarchical acceleration structure), and there are no further intersections to be found in the branches of the hierarchical acceleration structure below the node identified by the ray request.

If the one or more ray requests identifies only (one or more) leaf nodes, then the first progress sequential value can be updated in step 323 to the next sequential value following the latest sequential values amongst all sequential values of the leaf node(s) of the ray request(s) processed in step 322. The first progress sequential value therefore indicates which leaf nodes have been processed in step 322, and which have not.

The above provided example provides a simple implementation for the provided mechanism of step 323. However, a more complete and effective approach for performing step 323 will be described later.

The intersection testing process 320 also comprises a process 325 which determines whether the process 320 should end or begin a new pass. If no new ray requests need to be generated (e.g. there were no intersections found, or the intersections were all with elements, e.g. primitives, identified by leaf nodes) then the process cannot, or does not need to, descend any further into the hierarchical acceleration structure.

A repeat flag may be used to determine whether a new pass is required. If the repeat flag has not been set then there are no further nodes to test and the process 320 may end. However, if the repeat flag has been set (as described below) then this indicates that a new pass through the hierarchical acceleration structure is required and the process 320 does not end.

In some embodiments, the repeat flag/value is omitted. In particular, the first progress information can be used instead of the repeat flag/value (as it will indicate for which nodes it is known/unknown whether the ray intersects). If the first progress information indicates that an intersection/non-intersection is known for all nodes, then the process 320 can end.

The intersection process 320 also comprises a process 324 of processing any identified intersections and the first progress information to define the one or more ray requests to be obtained in a subsequent iteration of the intersection process 320. For example, when an intersection with an element is identified, a new ray request may be defined for the node that represents that element. When this ray request is obtained in a subsequent iteration of the intersection process 320, the elements identified by that node will be tested for intersections. In this way, the testing process descends the hierarchical acceleration structure towards the leaf nodes. Process 324 may define up to the predetermined maximum number of ray requests for the next iteration. If the number of ray requests defined is fewer than the number of intersections (with elements represented by a node), then clearly it will be necessary to revisit these elements in a subsequent pass. The first progress information may be used, at that time, to define ray requests for those intersections for which they were not defined in the current pass. Furthermore, if the testing process has reached the bottom of the hierarchical acceleration structure and the repeat flag is set (as described above in relation to step 325) then a new pass should be started. To start a new pass the repeat flag (if present) may be cleared and a new ray request may be defined indicating a starting point in the hierarchical acceleration structure for the new pass. This ray request may identify the root node, or, as described below, may identify another node in the structure.

Figure 4:
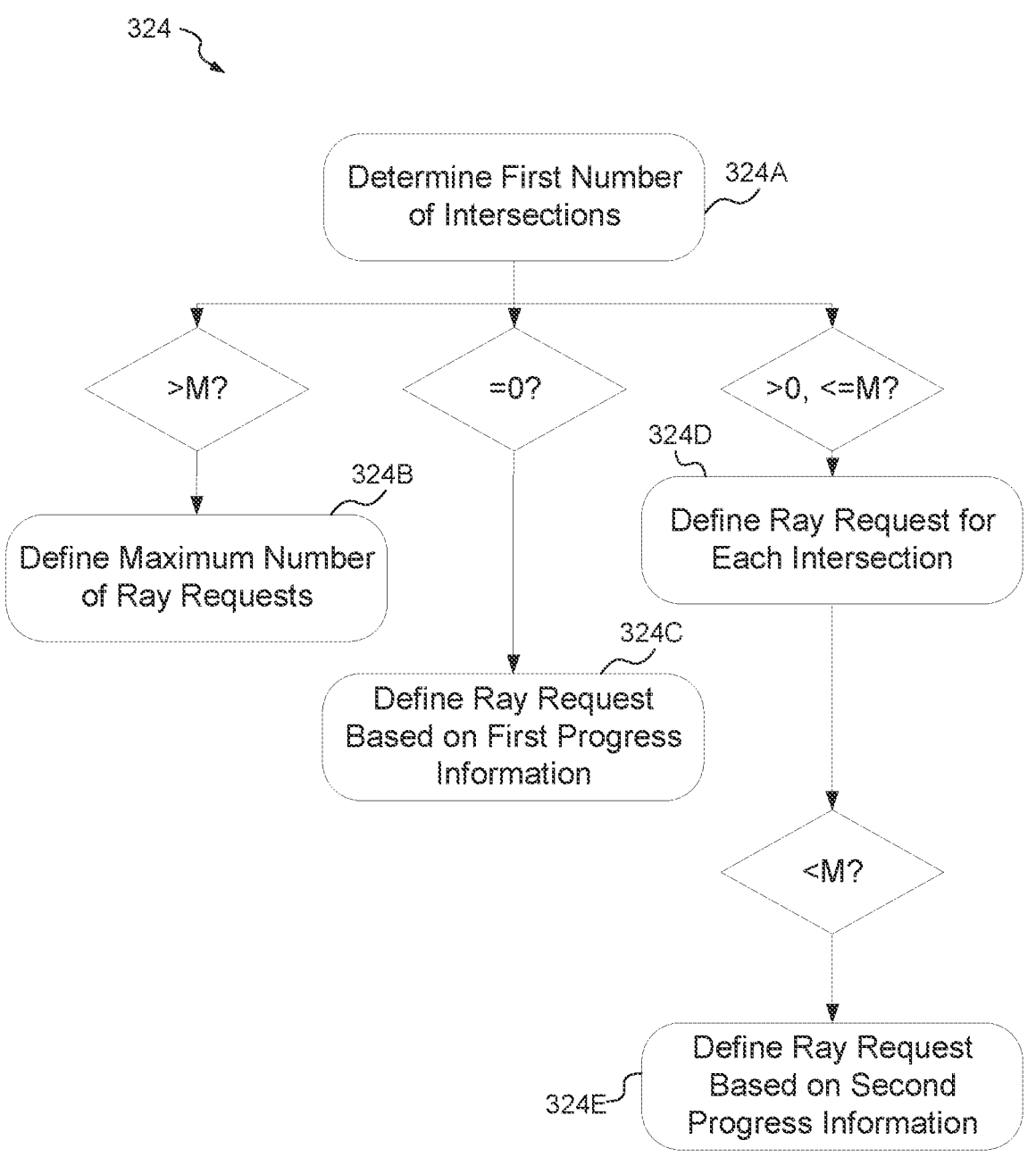
FIG. 4 is a flowchart illustrating part of a method.

FIG. 4 illustrates an embodiment of process 324.

Process 324 comprises, if step 322 identifies intersections between the ray and one or more bounding boxes (each represented by a node of the hierarchical acceleration structure) generating one or more ray requests based on the intersections. In particular, each generated ray request may identify the ray and a node that represents a different one of the intersected bounding boxes.

If step 322 fails to identify any intersections between the ray and a bounding box, then process 324 may determine that a new pass (through the hierarchical structure) is required. In this case, process 324 uses the first progress information to generate the ray request. In particular, the first progress information is used to identify a leaf node for which it is not known whether or not elements of leaf nodes intersect the ray. The first progress information may, for instance, then be used to identify a non-leaf node which branches into this identified leaf node. In other words, a ray request is defined which will cause the ray to be tested for intersections in a part of the hierarchical acceleration structure which the first progress information indicates that it has not yet been tested in.

The precise process of defining one or more ray requests may depend upon the number of intersections, identified in step 322, between the ray and any element identified by any non-leaf node identified in the ray requests obtained in step 321.

In particular, the process may depend upon the number of identified intersections (in step 322) between the ray and any elements that are either: represented by a leaf node having a value sequentially at or after the first progress sequential value identified by a non-leaf node identified by the ray requests (obtained in step 321); or represented by a non-leaf node which is a parent node of at least one leaf node that has a value sequentially at or after the first progress sequential value identified by a non-leaf node identified by the ray requests (obtained in step 321).

Thus, process 324 may comprise performing a step 324A of determining a first number of identified intersections. The first number of identified intersections is the number of identified intersections which are an intersection between the ray and an element represented by a node that has, or is a parent node of one or more nodes that have, a sequential value sequentially at or after the sequential value identified by the first progress information. Step 324A is performed by processing the first progress information and the identified intersections.

The process performed by step 324A to determine whether a leaf node (that represents an intersected element) has a sequential value sequentially at or after the sequential value identified by the first progress information is fairly simple, by simply comparing the sequential value to the first progress sequential value.

The process performed by step 324A to determine whether or not a particular non-leaf node is a parent node of a leaf node having a sequential value sequentially at or after the first progress sequential value, will depend upon the content of the value of each non-leaf node.

Consider a first scenario in which step 312 defines two values for each non-leaf node, a first value identifying the earliest sequential value of any leaf node that branches from the non-leaf node and a second value identifying the latest sequential value of any leaf node that branches from the non-leaf node. Determining whether or not the node is a parent node of a leaf node having a value sequentially at or after the first progress sequential value can be performed by determining whether or not the first progress sequential value falls within the sequence defined by the sequential values identified by the first and second values of the non-leaf node. The lower bound of the sequence is defined by (e.g. equal to) the first value and the upper bound of the sequence is defined by (e.g. equal to) the second value.

Consider a second scenario in which step 312 defines a single value for each non-leaf node, the single value identifying the earliest sequential value of any leaf node that branches therefrom. In this scenario, determining whether or not the node is a parent node of a leaf node having a value sequentially at or after the first progress sequential value can be performed by determining whether or not the first progress sequential value falls within the sequence defined by, as the earliest sequential value in the sequence, the sequential value identified by the value of the said node and, as the latest sequential value in the sequence, the sequentially closest sequential value amongst the sequential values of other nodes at the same hierarchical level that are sequentially after the sequential value identified by the value of the said node.

Other approaches will be apparent to the skilled person.

If step 324A determines that the first number of identified intersections is greater than the predetermined maximum number of ray requests, then step 324B may be performed.

Step 324B may comprise defining the one or more ray requests ("first set of one or more ray requests") for the next iteration of the process 320, where the number of defined ray requests is equal to the predetermined maximum number, M. Each defined ray request may identify a node (that represents one of the intersected elements as identified in step 322), which has a sequential value, or is a parent node of a leaf node having a sequential value, sequentially at or after the first progress sequential value.

In particular, the first set of one or more ray requests may identify one or more nodes (each representing an intersected element) which have a sequential value, or are parent nodes of nodes having a sequential value, sequentially closest to (but not earlier than) the first progress sequential value.

If step 324A determines that the first number of identified intersections is zero, then a step 324C may be performed.

Step 324C may comprise defining a single ray request for the next iteration. The defined ray request may identify a node of the highest level of the hierarchical structure that is a parent node of a leaf node having the first progress sequential value.

If step 324A determines that the first number of identified intersections is greater than zero, but less than or equal to the predetermined maximum number M, then step 324D may be performed.

Step 324D may comprise defining a ray request for each intersection identified in step 322. In particular, each defined ray request may identify a node that represents a respective one of the intersected elements.

Turning back to FIG. 3, the iterative process 320 ends when it is known, for every element of every leaf node of the hierarchical structure, whether or not the ray intersects with said element. As previously explained, this criterion may be checked in a step 325. This information may be contained by a flag for the ray, e.g. a repeat value, which indicates whether or not there are outstanding leaf-nodes having elements for which is it not known whether or not the ray intersects. The flag for the ray may be updated in step 322 or 323, e.g. based on a failure to identify any intersections and the (updated) first progress information no longer identifying any of sequential values of leaf nodes of the hierarchical structure. In other examples, the first progress information could be used.

If the predetermined maximum number of ray requests M is 1, then the above described approach effectively performs one or more search passes through the hierarchical acceleration structure, where a search pass is a single process of testing a ray against elements of a node at each level of the hierarchical structure, until either no intersections are identified or until intersection testing with elements of a leaf node is performed. Each search pass comprises one or more iterations of the intersection testing process 320.

The previous description of the method 300 describes a fairly simple example in which the first progress information is naively updated based on any identified intersections.

In some examples, the updating of the first progress sequential value, when no intersections with a non-leaf node are identified, can be improved by storing information on one or more past intersections.

In particular, the progress information may further comprise second progress information 315B. The second progress information identifies the sequentially earliest sequential value amongst: sequential values of any leaf node that represents any intersected element for which no ray request will be or has been defined in that iteration of the intersection testing process; and sequential values of any leaf node (for which no ray request will be or has been defined in that iteration of the intersection testing process) which branches from any non-leaf node that represents any intersected element.

This information may be in the form of one or more "second progress sequential values", equal to this sequentially earliest sequential value. This second progress information can be generated/updated after the ray requests have been generated in process 324 or in step 323.

For example, if the ray intersects with more than the predetermined maximum number (M) of elements represented by leaf nodes that have, or non-leaf nodes which are parent nodes of one or more leaf nodes that have, a sequential value sequentially at or after the first progress sequential value, then the second progress information can be updated to identify the (M+1)th sequentially earliest sequential value amongst: sequential values of any leaf nodes that represents any intersected element (identified in step 322) and sequential values of any leaf nodes branching from any non-leaf node that represents any intersected element (identified in step 322).

If second progress information is used, then the step of updating the first sequential information in step 323 may comprise, if step 322 identifies no intersections between the ray and elements of non-leaf nodes, updating the first sequential information to identify the same sequential value identified by the second progress information. In this way, the second progress information is used to indicate nodes which need to be tested in a later pass through the hierarchical acceleration structure. Unlike the system based on only the first progress information, the system using the second progress information is able to carry forward, into the next pass, information derived from intersection testing performed during the current pass. In particular, where there are nodes for which intersections are not identified, the second progress sequential value may advance further than the first progress sequential value. This may allow less intersection testing work to be done in the subsequent pass.

This approach results in, if step 322 identifies no intersections between the ray and elements of non-leaf nodes, the ray request in step 324 being defined based on the sequential value previously identified by the second progress information (e.g. in step 324C in FIG. 4).

Reverting back to FIG. 4, the second progress information could also be used to define a further ray request if the ray intersects with between zero and the maximum number of elements represented by non-leaf nodes having a value sequentially at or after the first progress sequential value, in a step 324E (i.e. performed when step 324D is also performed if the first number of intersection is between 0 and M exclusive).

Step 324E comprises defining at least one further ray request for a subsequent iteration of the process 320 using the second progress information. A further ray request may, for example, identify the node of the highest level of the hierarchical structure that is a parent node of one or more leaf nodes having a sequential value that is sequentially closest to, but no later than, the sequential value identified by the second progress information. This approach can help anticipate the generation of future ray requests.

Of course, step 324E is not performed if the predetermined maximum number of ray requests (M) is 1.

In the above-described approach, it is generally assumed that the second progress information identifies only the sequential value of a single leaf node, or a single leaf node branching from a non-leaf node, that represents an element with which the ray intersected (but has not yet been itself tested). However, in some examples, the second progress information may identify the sequential value(s) of multiple leaf nodes, and/or leaf nodes branching from one or more non-leaf nodes that represent elements with which the ray intersected.

Generally, the second progress information identifies one or more of the sequentially earliest values of leaf nodes (having a value sequentially after the first progress sequential value) that represent elements (or branching from non-leaf nodes that represent elements) which have previously been identified as intersecting a ray, but for which no ray request has been or will be generated during the current iteration of the process 300. In contrast, first progress information identifies leaf nodes for which intersection results have not yet been obtained or are not otherwise known, regardless of whether that leaf node represents an element, or branches from a non-leaf node that represents an element which has been, or will be, intersection tested in the current pass.

The above approach may be performed for any suitable hierarchical acceleration structure, including either a TLAS or a BLAS.

In particular examples, the above described method 300 is performed for a TLAS, with a new version or instantiation of the method being performed for each BLAS identified by an instance with which the ray is determined to intersect. By way of example, a new version of the method 300 could be instantiated if it is detected that the ray intersects with an instance in step 322.

For the sake of clarity, the term "version" is here used to mean a new instantiation of the method, commonly referred to as an "instance". The common term "instance" is not used to avoid confusion with an instance of the hierarchical acceleration structure, previously described.

Thus, it will be apparent that during any single execution of method 300 for a TLAS, then one or more executions of method 300 for a BLAS may be performed.

Optionally, the original version of the method 300 (e.g. for the TLAS) is suspended whilst the ray is processed with respect to the BLAS. In some embodiments, only one version of the method 300 propagates at a time (e.g. either the version 300 for the TLAS propagates or a single version of the method 300 for a BLAS propagates).

In some examples, the progress information may separately store progress information with respect to the TLAS and an ongoing BLAS, i.e. also store BLAS-specific progress information.

Thus, the progress information may store third progress information which, when a second version of the method 300 has been triggered by intersection with an instance in the TLAS, identifies the earliest sequential value amongst the sequential values of leaf nodes (of the BLAS) for which it is not known whether or not the ray intersects any of their elements.

Separately storing TLAS and BLAS specific information allows the original version of the method 300 (for the TLAS) to easily recommence when ray tracing using the BLAS has been completed.

After ray tracing using a BLAS has been completed, the first progress information may be updated to identify a sequential value after the sequential value of the node that represents the instance that triggered ray tracing using the BLAS. This can be performed using any previously described approach (e.g. making use of second progress information or the like).

In some examples, method 300 further comprises storing instance information. The instance information identifies any leaf nodes (that identify one or more instances) having a sequential value sequentially at or after the first progress sequential value where it is determined that the ray intersects an instance identified by the leaf nodes.

If valid instance information is stored (i.e. if the ray intersects with leaf nodes that identify instances, as described above), than the method 300 (for the TLAS) is suspended and a new version of method 300 is performed for the BLAS associated with the instance (which is identified by the node having the sequentially earliest value identified by the instance information). The instance information is updated each time a version of the method for a BLAS is complete.

If no valid instance information is stored, then the method 300 progresses as normal.

The above described approach is described in the context of performing intersection testing between a single ray and elements described by a single hierarchical acceleration structure (and optional one or more secondary hierarchical acceleration structures or BLAS's dependent therefrom).

In some embodiments, a version of the method 300 is performed for each of a plurality of rays. The same hierarchical structure may be used for each of the plurality of rays (e.g. to perform intersection testing between elements in a same scene and each of a plurality of different rays).

The step of identifying any intersections between the ray and any elements identified by any node identified by the one or more ray requests could be performed at a same time for different versions of the method 300 for different rays.

In particular, step 322 may comprise a coherence gathering step, comprising gathering or bundling multiple rays (of different ray requests across different versions of the method 300) into sets of rays ("ray sets"). Each ray set identifies rays that are to be tested against the elements of a same node. This is performed by processing ray requests obtained in different versions of method 300 to identify groups of ray requests identifying the same node, to thereby determine which rays form part of a same ray set.

Each ray set can then be tested against the elements of the node common to all rays of that ray set, to thereby identify (for each ray) any intersections between the ray and the elements of the node.

Use of a coherence gathering step means that a list of elements (of a particular node) and (geometric) information on elements of the test list only need to be retrieved from memory once in order to test all the rays in a ray set, e.g. rather than being retrieved for each separate ray request (e.g. for each iteration of method 300). Thus, the number of memory retrievals can be significantly reduced.

In some embodiments, a hierarchical acceleration structure describing a whole scene is sub-divided into two or more sub-structures, each sub-structure representing part of the hierarchical acceleration structure and being a hierarchical acceleration structure itself. Multiple versions of the method 300 may be performed to perform an intersection testing process between a ray and the elements of each sub-structure. Thus, if a hierarchical acceleration structure is sub-divided into N (N>=2) sub-structures, then N versions of the method 300 may be instantiated for a single ray.

The process 300 may be performed for each of a plurality of rays. In these circumstances, steps 311 and 312 only need to be performed once for each ray to be tested against elements of a same scene (e.g. elements of a same hierarchical acceleration structure).

Figure 5:
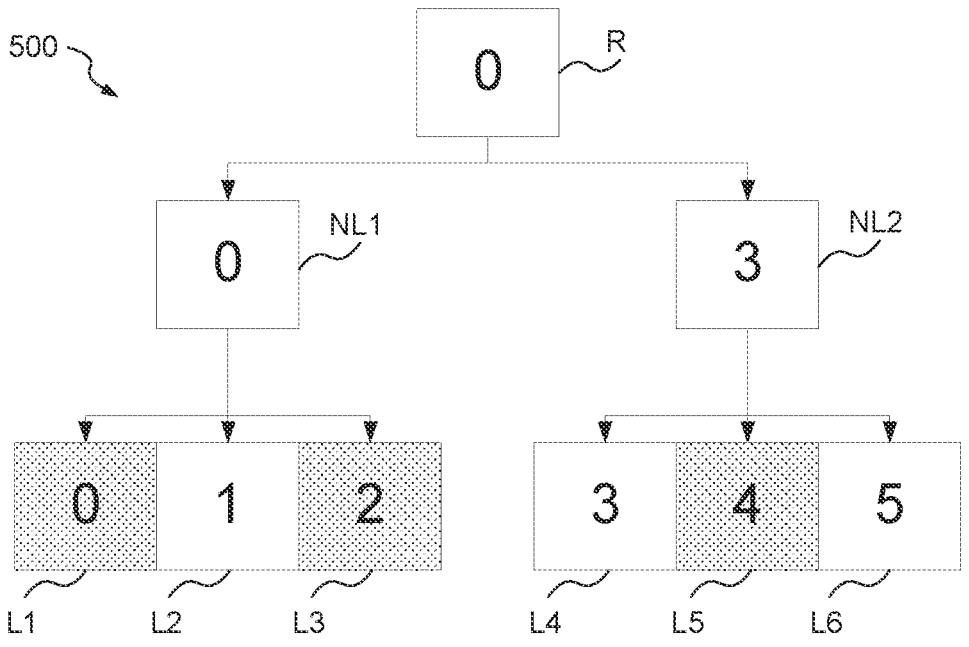
FIG. 5 illustrates a hierarchical acceleration structure.

FIG. 5 illustrates a simplified working example of a hierarchical acceleration structure 500. The hierarchical acceleration structure 500 is here a TLAS, having six leaf nodes L1-L6, two non-leaf nodes NL1-NL2 and a root node R. The root node is, of course, also an example of a non-leaf node.

Each node represents a different bounding box for a scene. Each leaf node identifies one or more elements (e.g. a primitive or an instance). Each non-leaf node identifies one or more bounding boxes, each bounding box being associated with and represented by a further node of the hierarchical structure.

A first leaf node L1, a second leaf node L2 and a third leaf node L3 all branch from a first non-leaf node NL1. A fourth leaf node L4, a fifth leaf node L5 and a sixth leaf node L6 all branch from a second non-leaf node NL2. Both the first NL1 and second NL2 non-leaf nodes branch from the root node R.

Each leaf node L1-L6 is assigned a different sequential value (here: ranging from 0 to 5, incrementing by 1). The sequential values of leaf nodes branching from a same non-leaf node are sequential to one another. Thus, the values of the first, second and third leaf nodes branching from the first non-leaf node are sequential to one another (in a sub-sequence of 0 to 2). Similarly, the values of the fourth L4, fifth L5 and sixth L6 leaf nodes branching from the second non-leaf node NL2 are sequential to one another (in a sub-sequence of 3 to 5).

Each non-leaf node NL1, NL2, R is assigned a value that identifies (or facilitates identification of) the earliest sequential value of a leaf node branching (e.g. via one or more other leaf nodes) therefrom. As one example, each non-leaf node may be simply assigned a value equal to the earliest sequential value of a leaf node branching therefrom. For example, the second non-leaf node may be assigned a value of 3 to identify the earliest sequential value of the leaf nodes branching therefrom.

A description of applying the method (described with reference to FIG. 3) to the hierarchical acceleration structure 500 is hereafter described, for improved contextual understanding. For the sake of simplicity, the maximum number of ray requests that can be obtained and/or defined is set to 1. It is also assumed that, if used, the second progress information identifies only a single other value (i.e. a value for a single other intersection).

For this scenario, the ray intersects with the elements associated with the first L1, third L3 and fifth L5 leaf nodes. Thus, there will be three search passes through the hierarchical structure, where a search pass is a single process of testing a ray against elements of a node at each level of the hierarchical structure. As the hierarchical structure is formed of three levels, each search pass comprises three iterations of the intersection testing process.

For a first iteration of the intersection testing process, the first progress information identifies the first leaf node L1 (having the earliest sequential value), e.g. is set to 0. The first progress information therefore indicates the first leaf node for which intersection results are not yet known. A ray request obtained in the first iteration may identify the root node R.

The intersection testing process then identifies intersections between the ray and each element (here: bounding boxes represented by further nodes) identified by the root node R. An intersection will be detected for both elements of the root node, i.e. for both elements that are represented by a different non-leaf node NL1, NL2. The first progress information is then updated based on the detected intersections. Here, no change is made to the first progress information as the sequentially earliest value of any sequential value of the nodes associated with the intersected elements identifies the same value as the existing sequential value identified by the current first progress information. A single new ray request is defined, which identifies the first non-leaf node NL1 (as it has the sequentially earliest value). If used, the second progress information identifies the value of the second non-leaf node NL2 (as it has the next sequential value). The second progress information therefore identifies a starting point for a future search pass, based on knowledge of intersections determined during the current search pass. The repeat flag (if present) will be set, as an intersection has been identified for which no ray request will be generated.

During the second iteration, the obtained ray request is the ray request defined in the previous iteration, which identifies node NL1. The elements (bounding boxes associated with nodes) of the first non-leaf node NL1 undergo an intersection testing process with the ray. An intersection will be detected between the ray and the bounding box for the first leaf node L1 and between the ray and the bounding box for the third leaf node L3. The first progress information is then updated based on the detected intersections. Here, no change is made to the first progress information as the sequentially earliest value of any sequential value of the nodes associated with the intersected elements identifies the same value as the existing sequential value identified by the current first progress information. Note that although an intersection has been identified between the ray and the bounding boxes representing leaf nodes L1 and L3, intersection testing has not yet been performed for the elements (e.g. instances or primitives) identified by these nodes. Therefore, no change is made to the first progress information to indicate leaf nodes for which intersection testing results are known. A single new ray request is defined, which identifies the first leaf node L1 (as it has the sequentially earliest value amongst nodes associated with intersected elements). If used, as it is in this example, the second progress information is updated to a value of 2, to identify the value of the third leaf node L3. The second progress information therefore identifies a node representing an intersected element on a branch of the acceleration structure for which a ray request has not been (and will not be) defined in this pass, but which should be traversed in a later pass).

During the third iteration, the obtained ray request is again the ray request defined in the previous iteration, i.e. a ray request identifying leaf node L1. The elements (instances and/or primitives) of the first leaf node L1 undergo an intersection testing process with the ray. The first progress information is then updated to identify a sequentially next sequential value after the sequential value of the leaf node for which intersection testing has been performed (i.e. in this example it could be set to 1), or, the same sequential value as identified in the second progress information if present. In this example, the second progress information is present (i.e. contains valid data) and was set to 2 in the previous pass, and therefore the first progress information is set to 2. As no new intersections with non-leaf nodes are identified, a new pass is started by defining a ray request that identifies the highest level node in the acceleration structure having the closest value which is sequentially at or before the sequential value identified by the updated first progress information (here: the root node). If used, the second progress information may be cleared or erased.

Of course, if an intersection with an instance is identified, then a new version of the herein described method may be initiated for performing ray intersection testing with the relevant BLAS. This process has not been described for the sake of conciseness.

For the second pass through the acceleration structure, the first progress information identifies the sequential value of the third leaf node (i.e. the value 2), and the repeat flag (if present) will be cleared.

During the second pass through the acceleration structure, any identified intersections with the element representing the first leaf node are effectively ignored, as it is already known whether or not the ray intersects with elements of the first intersection that have already been processed. The knowledge of leaf nodes for which intersection testing results are already known is reflected in the value of the first progress information, which is set to a value (e.g. 2), which is higher than the sequential value (e.g. 0) of the first leaf node L1.

The second pass therefore comprises third leaf node L3 undergoing an intersection testing process with the ray. At the end of the second pass, the first progress information is modified to identify the value (e.g. 3) of the fourth leaf node. This is because either the first progress information is changed to identify a sequentially next sequential value (after the sequential value of the third leaf node) or may be changed to identify the same sequential value as identified in the second progress information (which will identify the value identified by the second non-leaf node NL2, equivalent to the value of the fourth lead node L4). The second progress information will identify this value, as it is the most node having the lowest sequential value for which no ray request was generated during the current pass of the hierarchical acceleration structure.

Thus, for a third pass through the acceleration structure, any intersection with the first non-leaf node N L1 is ignored, as the first progress information identifies the sequential value of the fourth leaf node. The second non-leaf node NL2 has the sequential value 3, indicating that any leaf node with a sequential value of 3 or above (such as the fourth leaf node) is represented by the portion of the acceleration structure beneath NL2. The third pass will therefore process that portion of the acceleration structure. Following the iterative procedure described above, the third pass will identify an intersection with leaf node L4, and the elements of that node will undergo an intersection testing process with the ray. Having identified no further intersections, e.g. among the elements of NL2, the repeat flag (if used) will not be set, no further passes will be performed, and the testing process for the ray ends.

Figure 6:
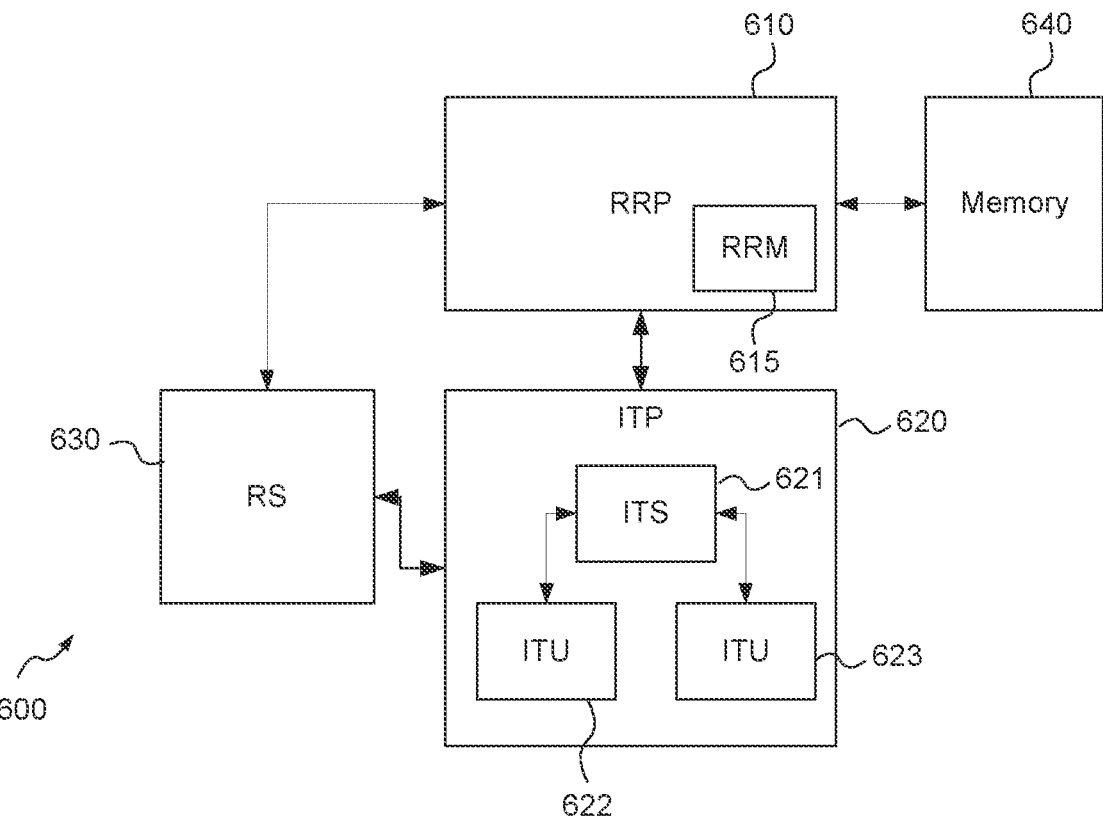
FIG. 6 illustrates an intersection testing system.

FIG. 6 illustrates an intersection testing system 600 according to an embodiment of the invention. The intersection testing system is configured to perform the steps of herein described methods.

The illustrated intersection testing system 600 comprises a ray request processor (RRP) 610; an intersection test processor (ITP) 620; a ray store (RS) 630 and a memory 640.

The ray store 630 stores information on all rays that are to undergo intersection testing with elements of a particular scene. The stored information may contain at least a unique identifier of the ray and geometric information of the ray (e.g. a source and direction of a ray with respect to the scene). The unique identifier of the ray may, for example, simply be a memory address of the ray store 630.

The memory 640 stores information on the hierarchical structure, including elements of the hierarchical structure. In particular, the memory 640 may store node information and information about geometries of each element that is to be involved in an intersection test.

The ray request processor 610 is configured to perform steps 321, 323 and 324 of the method 300 described with reference to FIG. 3. The intersection test processor 620 is configured to perform step 322 of the method 300.

Thus, the ray request processor 610 obtains and defines the ray requests, and updates progress information for a ray. The progress information for the ray may therefore be stored in the ray store 630.

When a ray is first added to the ray store (e.g. by an external device), the ray request processor may communicate with the ray store to generate or initiate a first ray request. The first ray request identifies this new ray and the root node of the hierarchical acceleration structure, so that the ray begins its traversal through the acceleration structure.

When a new ray is added, progress information is also initiated for the ray (and preferably stored alongside other ray information in the ray store).

The ray request processor 610 submits information on tests to be performed to the intersection test processor 620. In particular, the ray request processor 610 obtains or generates ray requests, and submit information to the intersection test processor 620 that enables the intersection test processor to co-ordinate intersection testing. The ray request processor 610 may comprise or communicate with a ray request memory/buffer (RRM) 615, which stores ray requests that are to be processed.

In some examples, the ray request processor 610 is also configured to provide the intersection test processor with geometric information about the elements of the scene that are involved in intersection testing for the processed ray requests. This process may comprise requesting data from a memory 640 containing the geometries of each element that is to be involved in an intersection test.

In other examples, the intersection test processor 620 is configured to obtain this geometric information itself.

The intersection test processor (ITP) 620 may comprise an intersection test scheduler (ITS) 621 that co-ordinates intersection testing between rays and elements of the scene (e.g. bounding boxes, instances or primitives). The intersection test processor receives ray requests from the ray request processor. The intersection test scheduler may communicate with one or more intersection testing units (ITU) 622, 623 to perform the intersection testing based on the received ray requests. In particular, the testing units may perform the actual intersection testing, by comparing geometries of an element with the geometric information of the ray, following known operations. The intersection test scheduler 621 can schedule the performance of testing units 622, 623.

The above description indicates how sequential values assigned to leaf nodes can be used to track which leaf nodes have already been processed. Various methods of assigning sequential values to leaf nodes are contemplated.

Values for leaf nodes can be assigned when constructing the acceleration structure, e.g. if using a bottom-up hierarchy builder. This approach avoids the need to fully transverse the acceleration structure to assign values to the leaf nodes.

In one example, during construction of the acceleration structure, each time a non-leaf node is generated (representing a bounding box of the scene), a total number of leaf nodes branching therefrom ("leaf node sum") is determined. Non-leaf nodes that identify one or more bounding boxes associated with other non-leaf nodes can use the leaf node sum calculated for the said other non-leaf nodes to simplify this procedure. Once the total number of leaf nodes is known, then sequential values can be simply assigned throughout the acceleration hierarchical structure.

For instance, with reference to the acceleration structure 500 described by FIG. 5, once it is known that there are six leaf nodes, then it can be determined that six sequential values are required. It is also known how many leaf nodes branch from each non-leaf node, so that sub-sequences of sequential values can be assigned to each non-leaf node, for setting the sequential values of each leaf node. For instance, a first sequence (containing an earliest three sequential values) may be assigned to the first non-leaf node NL1, and a second sequence (containing a next earliest three sequential values) can be assigned to the second non-leaf node NL2. The sequential values for each sequence can then be assigned to each leaf node (branching from the non-leaf nodes).

Figure 7:
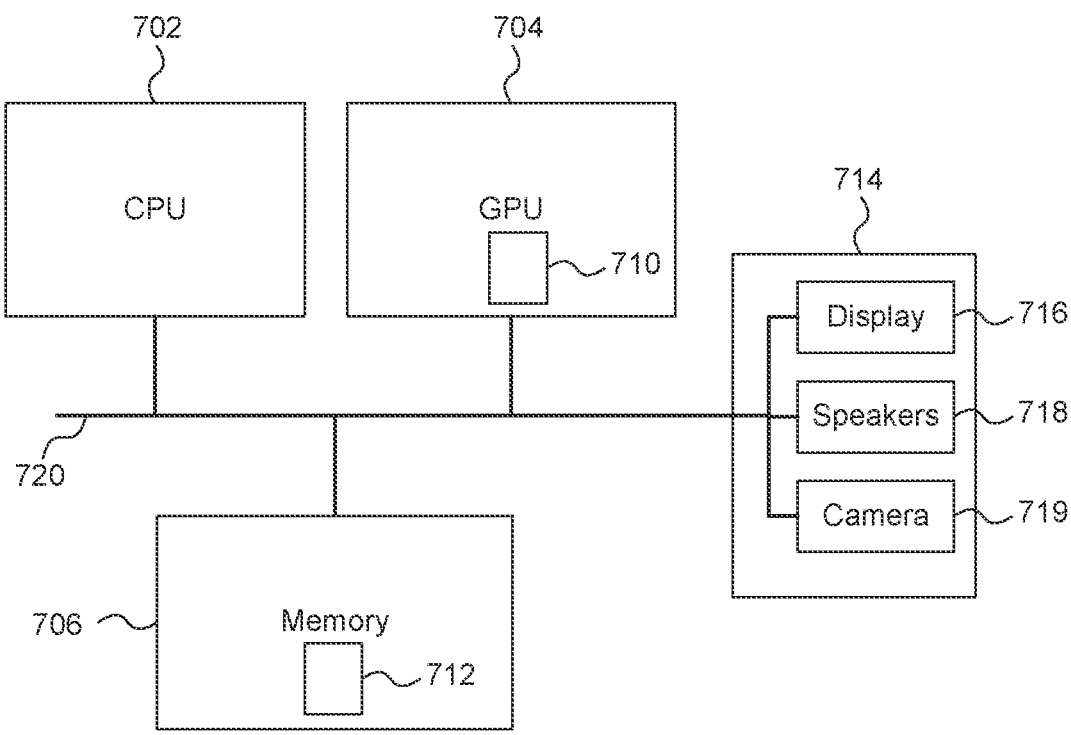
FIG. 7 shows a computer system in which a graphics processing system is implemented.

FIG. 7 shows a computer system in which a graphics processing system may be implemented. The computer system comprises a CPU 702, a GPU 704, a memory 706 and other devices 714, such as a display 716, speakers 718 and a camera 719. A processing block 710 (corresponding to intersection testing system 600) is implemented on the GPU 704. In other examples, the processing block 710 may be implemented on the CPU 702. The components of the computer system can communicate with each other via a communications bus 720. A store 712 (corresponding to memory 112) is implemented as part of the memory 706.

The intersection testing system of FIG. 6 was shown as comprising a number of functional blocks. This is schematic only and is not intended to define a strict division between different logic elements of such entities. Each functional block may be provided in any suitable manner. It is to be understood that intermediate values described herein as being formed by an intersection testing system need not be physically generated by the intersection testing system at any point and may merely represent logical values which conveniently describe the processing performed by the intersection testing system between its input and output.

The intersection testing systems described herein (and ray tracing systems and/or graphics processing systems incorporating them) may be embodied in hardware on an integrated circuit. The intersection testing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, Neural Network Accelerator (NNA), System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture an intersection testing system (or ray tracing system or graphics processing system) configured to perform any of the methods described herein, or to manufacture an intersection testing system (or ray tracing system or graphics processing system) comprising any apparatus described herein. An integrated circuit definition dataset may be, for example, an integrated circuit description.

Therefore, there may be provided a method of manufacturing, at an integrated circuit manufacturing system, a system (or ray tracing system or graphics processing system) as described herein. Furthermore, there may be provided an integrated circuit definition dataset that, when processed in an integrated circuit manufacturing system, causes the method of manufacturing a system (or ray tracing system or graphics processing system) to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an intersection testing system (or ray tracing system or graphics processing system) will now be described with respect to FIG. 8.

Figure 8:
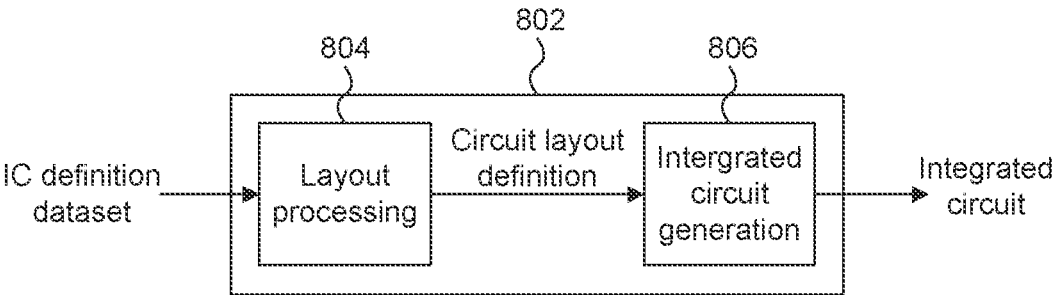
FIG. 8 shows an integrated circuit manufacturing system for generating an integrated circuit embodying a graphics processing system.

FIG. 8 shows an example of an integrated circuit (IC) manufacturing system 802 which is configured to manufacture an intersection testing system (or ray tracing system or graphics processing system) as described in any of the examples herein. In particular, the IC manufacturing system 802 comprises a layout processing system 804 and an integrated circuit generation system 806. The IC manufacturing system 802 is configured to receive an IC definition dataset (e.g. defining an intersection testing system as described in any of the examples herein), process the IC definition dataset, and generate an IC according to the IC definition dataset (e.g. which embodies an intersection testing system as described in any of the examples herein). The processing of the IC definition dataset configures the IC manufacturing system 802 to manufacture an integrated circuit embodying an intersection testing system (or ray tracing system or graphics processing system) as described in any of the examples herein.

The layout processing system 804 is configured to receive and process the IC definition dataset to determine a circuit layout. Methods of determining a circuit layout from an IC definition dataset are known in the art, and for example may involve synthesizing RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimize the circuit layout. When the layout processing system 804 has determined the circuit layout it may output a circuit layout definition to the IC generation system 806. A circuit layout definition may be, for example, a circuit layout description.

The IC generation system 806 generates an IC according to the circuit layout definition, as is known in the art. For example, the IC generation system 806 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 806 may be in the form of computer-readable code which the IC generation system 806 can use to form a suitable mask for use in generating an IC.

The different processes performed by the IC manufacturing system 802 may be implemented all in one location, e.g. by one party. Alternatively, the IC manufacturing system 802 may be a distributed system such that some of the processes may be performed at different locations, and may be performed by different parties. For example, some of the stages of: (i) synthesizing RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an intersection testing system (or ray tracing system or graphics processing system) without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 8 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 8, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialized fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method of performing iterative intersection testing between a ray and elements identified by nodes of a hierarchical acceleration structure of a ray tracing system, the computer-implemented method comprising:

defining a sequential value for each leaf node of the hierarchical acceleration structure, wherein the sequential values of the leaf nodes that branch from any given non-leaf node are sequential with respect to one another;

defining progress information for the ray, the progress information comprising first progress information identifying the earliest sequential value amongst the sequential values of leaf nodes for which it is not known whether or not the ray intersects any of their elements;

during an intersection testing process, obtaining one or more ray requests for the ray, each ray request identifying a different node that identifies elements against which the ray is to undergo intersection testing;

identifying, by processing the obtained one or more ray requests, any intersections is between the ray and any elements identified by any node identified by the obtained one or more ray requests; and updating the progress information based on any identified intersections between the ray and the elements identified by the nodes of the hierarchical acceleration structure;

processing the first progress information and the identified intersections to identify a first number of identified intersections which are an intersection between the ray and an element, of a non-leaf node, associated with a leaf node that has, or is a parent node of one or more leaf nodes that have, a sequential value sequentially at or after the sequential value identified by the first progress information; and defining one or more ray requests to be obtained in a subsequent iteration of the intersection process based on the first number of identified intersections.

2. The computer-implemented method of claim 1, wherein the step of obtaining one or more ray requests for the ray comprises obtaining up to a predetermined maximum number (M) of ray requests for the ray.

3. The computer-implemented method of claim 1, wherein, for a first iteration of the intersection testing process, the step of obtaining one or more ray requests comprises generating a ray request that identifies the root node of the hierarchical acceleration structure.

4. The computer-implemented method of claim 1, wherein the step of obtaining one or more ray requests for the ray comprises obtaining up to a predetermined maximum number (M) of ray requests for the ray, and wherein the step of processing the first progress information and any identified intersections to define one or more ray requests comprises, if the first number of identified intersections is less than or equal to the predetermined maximum number:

defining a ray request for each identified intersection between the ray and an element of a non-leaf node, each ray request identifying the node associated with the intersected element of the non-leaf node.

5. The computer-implemented method of claim 1, wherein the step of obtaining one or more ray requests for the ray comprises obtaining up to a predetermined maximum number (M) of ray requests for the ray, and wherein the step of processing the first progress information and any identified intersections to define one or more ray requests comprises:

if the first number of identified intersections between the ray and any elements of a non-leaf node is greater than the predetermined maximum number, defining a first set of one or more ray requests to be obtained for a next iteration of the intersection testing process, wherein the number of ray requests in the first set of one or more ray requests is equal to the predetermined maximum number of ray requests, and wherein each identified node in the first set of one or more ray requests:

is associated with an intersected element of a non-leaf node;

has a sequential value, or is a parent node of one or more leaf nodes having a sequential value, sequentially closest to, but not earlier than, the first progress sequential value amongst the nodes associated with an intersected element.

6. The computer-implemented method of claim 1, wherein the step of processing the first progress information and any identified intersections to define one or more ray requests comprises, if the first number of identified intersections between the ray and any elements of a non-leaf node is zero:

defining a ray request that identifies a node at the highest level of the hierarchical acceleration structure which is a parent node of the leaf node having a value equal to the sequential value identified by the first progress information.

7. The computer-implemented method of claim 1, wherein the first progress information comprises a value equal to the earliest sequential value amongst the sequential values of leaf nodes for which it is not known whether or not the ray intersects any of their elements.

8. The computer-implemented method of claim 1, wherein the value for each non-leaf node of the hierarchical acceleration structure comprises a value equal to the earliest sequential value of any leaf nodes that branch from the non-leaf node.

9. The computer-implemented method of claim 1, wherein the progress information further comprises second progress information which identifies the sequentially earliest sequential value amongst:

sequential values of any leaf nodes associated with any intersected element for which no ray request will be or has been defined in that iteration of the intersection testing process; and sequential values of any leaf node which branches from any non-leaf node, is associated with any intersected element, for which no ray request will be or has been defined in that iteration of the intersection testing process.

10. The computer-implemented method of claim 9, wherein the step of updating the progress information based on the identified intersections comprises, if no intersections with elements associated with non-leaf nodes are identified, updating the first progress information using the second progress information.

11. The computer-implemented method of claim 10, wherein the step of updating the progress information based on any identified intersections comprises, if no intersections with elements associated with non-leaf nodes are identified, controlling the first progress information to identify the sequential value identified by the second progress information.

12. An intersection testing system for performing iterative intersection testing between one or more rays and elements identified by nodes of a hierarchical acceleration structure, wherein:

a sequential value is defined for each leaf node of the hierarchical acceleration structure, wherein the sequential values of the leaf nodes that branch from any given non-leaf node are sequential with respect to one another; and progress information is defined for the ray, the progress information comprising first progress information identifying the earliest sequential value amongst the sequential values of leaf nodes for which it is not known whether or not the ray intersects any of their elements;

wherein the intersection testing system is configured to:

during an intersection testing process, obtain one or more ray requests for the ray, each ray request identifying a different node that identifies elements against which the ray is to undergo intersection testing;

identify, by processing the obtained one or more ray requests, any intersections between the ray and any elements identified by any node identified by the obtained one or more ray requests;

update the progress information based on any identified intersections between the ray and the elements identified by the nodes of the hierarchical acceleration structure;

process the first progress information and the identified intersections to identify a first number of identified intersections which are an intersection between the ray and an element, of a non-leaf node, associated with a leaf node that has, or is a parent node of one or more leaf nodes that have, a sequential value sequentially at or after the is sequential value identified by the first progress information; and define one or more ray requests to be obtained in a subsequent iteration of the intersection process based on the first number of identified intersections.

13. A graphics processing system configured to perform the method as set forth in claim 1.

14. A method of manufacturing, using an integrated circuit manufacturing system, a graphics processing system as set forth in claim 13, the method comprising:

processing, using a layout processing system, a computer readable description of the graphics processing system so as to generate a circuit layout description of an integrated circuit embodying the graphics processing system; and manufacturing, using an integrated circuit generation system, the graphics processing system according to the circuit layout description.

15. A non-transitory computer readable storage medium having stored thereon computer readable code configured to cause the method as set forth in claim 1 to be performed when the code is run.

16. A non-transitory computer readable storage medium having stored thereon an integrated circuit definition dataset that, when processed in an integrated circuit manufacturing system, configures the integrated circuit manufacturing system to manufacture a graphics processing system as set forth in claim 13.

17. An integrated circuit manufacturing system comprising:

a non-transitory computer readable storage medium having stored thereon a computer readable dataset description of a graphics processing system as set forth in claim 13;

a layout processing system configured to process the computer readable description so as to generate a circuit layout description of an integrated circuit embodying the system or the graphics processing system; and an integrated circuit generation system configured to manufacture the system or the graphics processing system according to the circuit layout description.

* * * * *